United States Patent
Gurdasani et al.

(10) Patent No.: US 10,594,579 B2
(45) Date of Patent: Mar. 17, 2020

(54) SYSTEM MONITORING DEVICE

(71) Applicant: Accenture Global Solutions Limited, Dublin (IE)

(72) Inventors: Vijay H. Gurdasani, Pune (IN); Rohit Jain, New Delhi (IN); Sumit Kumar Ghosh, Bangalore (IN); Neelam Ved, Mumbai (IN); Rajnee Maheshwari, Mumbai (IN); Ravi Ranjan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/041,948

(22) Filed: Jul. 23, 2018

(65) Prior Publication Data

US 2018/0331924 A1   Nov. 15, 2018

Related U.S. Application Data (63) Continuation of application No. 14/965,154, filed on Dec. 10, 2015, now Pat. No. 10,033,603.

(51) Int. Cl.
*H04L 12/26* (2006.01)
*G06F 16/182* (2019.01)
(Continued)

(52) U.S. Cl.
CPC .......... *H04L 43/06* (2013.01); *G06F 11/0751* (2013.01); *G06F 11/0766* (2013.01); *G06F 11/0793* (2013.01); *G06F 11/3055* (2013.01); *G06F 11/3495* (2013.01); *G06F 16/182* (2019.01); *G06F 11/3072* (2013.01); *G06F 11/3409* (2013.01); *G06F 11/3433* (2013.01); *G06F 2201/81* (2013.01); *G06F 2201/875* (2013.01)

(58) Field of Classification Search
None
See application file for complete search history.

(56) References Cited

U.S. PATENT DOCUMENTS 6,571,285 B1   5/2003   Groath
6,636,983 B1   10/2003  Levi
(Continued)

OTHER PUBLICATIONS

Extended European Search Report corresponding to EP 16 20 2451, dated Sep. 4, 2017, 17 pages.

(Continued)

*Primary Examiner* — Davoud A Zand
(74) *Attorney, Agent, or Firm* — Harrity & Harrity, LLP (57) ABSTRACT

A device may select an enterprise content management (ECM) system for monitoring. The ECM system may include a set of subsystems. The device may monitor the set of subsystems of the ECM system based on selecting the ECM system for monitoring. The device may perform a set of health checks on the set of subsystems based on monitoring the set of subsystems. The set of health checks may include a validation of a set of network addresses associated with the set of subsystems, an analysis of a set of log files associated with the set of subsystems, and a determination of a set of metrics associated with the set of subsystems. The device may generate a health check report based on the set of health checks. The device may provide the health check report.

20 Claims, 5 Drawing Sheets

(51) Int. Cl.
*G06F 11/34* (2006.01)
*G06F 11/07* (2006.01)
*G06F 11/30* (2006.01)

(56) References Cited

U.S. PATENT DOCUMENTS

| | | |
|---|---|---|
| 7,958,393 B2 | 6/2011 | Bobak |
| 8,713,106 B2 | 4/2014 | Spataro |
| 8,966,039 B1 | 2/2015 | Fultz et al. |
| 9,319,382 B2 | 4/2016 | Don, Jr. |
| 9,609,003 B1 | 3/2017 | Chmielewski |
| 9,710,482 B2 | 7/2017 | Fitzgerald |
| 10,033,603 B2 | 7/2018 | Gurdasani et al. |
| 10,200,504 B2 * | 2/2019 | Decenzo ............. H04L 65/4084 |
| 10,237,237 B2 * | 3/2019 | Dawes .................... H04L 67/10 |
| 2002/0198984 A1 | 12/2002 | Goldstein et al. |
| 2003/0046271 A1 | 3/2003 | Eastham |
| 2003/0145057 A1 | 7/2003 | Throop |
| 2004/0230981 A1 | 11/2004 | Hamilton et al. |
| 2004/0236746 A1 | 11/2004 | Loment |
| 2006/0053194 A1 | 3/2006 | Schneider |
| 2006/0080432 A1 | 4/2006 | Spataro |
| 2007/0174732 A1 | 6/2007 | Irby et al. |
| 2008/0134176 A1 * | 6/2008 | Fitzgerald ........... G06F 9/45537 718/1 |
| 2009/0260060 A1 | 10/2009 | Smith |
| 2014/0047513 A1 * | 2/2014 | van 't Noordende .. G06F 21/44 726/4 |
| 2014/0282018 A1 | 9/2014 | Amble et al. |
| 2015/0317221 A1 | 11/2015 | Sampath et al. |
| 2016/0014081 A1 * | 1/2016 | Don, Jr. .............. H04L 63/0236 726/11 |

OTHER PUBLICATIONS

Partial European Search report corresponding to EP 16202451.7, dated May 23, 2017, 16 pages.
IBM, http://www-03.ibm.com/software/products/en/ecmsystemmonitor, "Enterprise Content Management System Monitor", Oct. 23, 2013, 2 pages.

* cited by examiner

SYSTEM MONITORING DEVICE

RELATED APPLICATION

This application is a continuation of U.S. patent application Ser. No. 14/965,154, filed Dec. 10, 2015 (now U.S. Pat. No. 10,033,603), which is incorporated herein by reference.

BACKGROUND

An enterprise content management (ECM) system may include one or more servers associated storing, processing, and/or providing information associated with an organization. For example, a particular ECM system may provide documents generated and/or stored by the organization, content generated and/or stored by the organization, or the like. A user device may access a network address associated with the particular ECM system, and may present a user interface with which a user may provide a set of login credentials, such as a password, a username, or the like, to be granted access to information associated with the particular ECM system. Based on providing the set of login credentials, the particular ECM system may provide access to a portion of the information associated with the ECM system.

SUMMARY

According to some possible implementations, a device may include one or more processors. The device may select an enterprise content management (ECM) system for monitoring. The ECM system may include a set of subsystems. The device may monitor the set of subsystems of the ECM system based on selecting the ECM system for monitoring. The device may perform a set of health checks on the set of subsystems based on monitoring the set of subsystems. The set of health checks may include a validation of a set of network addresses associated with the set of subsystems, an analysis of a set of log files associated with the set of subsystems, and a determination of a set of metrics associated with the set of subsystems. The set of health checks may relate to a status of the ECM system. The device may generate a health check report based on the set of health checks. The health check report may include information associated with the validation of the set of network addresses, the analysis of the set of log files, and the determination of the set of metrics associated with the set of subsystems. The device may provide the health check report.

According to some possible implementations, a non-transitory computer-readable medium may store one or more instructions that, when executed by one or more processors, may cause the one or more processors to identify a target system on which to perform a health check. The one or more instructions, when executed by one or more processors, may cause the one or more processors to perform the health check on the target system. The health check may include a determination of a status of a set of subsystems of the target system. The one or more instructions, when executed by one or more processors, may cause the one or more processors to generate a health check report based on performing the health check on the target system. The health check report may include information identifying the status of the set of subsystems of the target system. The health check report may identify one or more issues associated with the set of subsystems of the target system. The one or more instructions, when executed by one or more processors, may cause the one or more processors to provide the health check report.

According to some possible implementations, a method may include identifying, by a device, an enterprise content management system. The method may include obtaining, by the device, information identifying a status of the enterprise content management system. The status may be related to an application associated with the enterprise content management system, an availability of the enterprise content management system, or a stability of the enterprise content management system. The obtaining the information identifying the status may include validating a set of network addresses associated with the enterprise content management system, analyzing a set of log files associated with the enterprise management system, or determining a set of metrics associated with the enterprise management system. The method may include generating, by the device, information identifying the status of the enterprise content management system. The method may include providing, by the device, the information identifying the status of the enterprise content management system.

BRIEF DESCRIPTION OF THE DRAWINGS

FIG. 4 is a flow chart of an example process for performing a health check on a target system, such as an enterprise content management system or the like.

DETAILED DESCRIPTION

The following detailed description of example implementations refers to the accompanying drawings. The same reference numbers in different drawings may identify the same or similar elements.

An enterprise content management (ECM) system may be utilized by an organization to organize information associated with the organization. For example, a particular ECM system may be utilized to organize audio content, video content, audio-video content, documents, data files, or the like. The ECM system may include an ECM core (e.g., a set of subsystems associated with a set of core functionalities of the ECM system) and an imaging core (e.g., a set of subsystems that provide imaging functionalities for the ECM system). Collectively, the ECM core and the imaging core may include a content collector subsystem, a content server subsystem, a process server subsystem, an application server subsystem, a background server subsystem, a data storage server subsystem, an imaging subsystem, or the like. The subsystems of the ECM core may provide functionalities of the ECM system, such as content management, content storage, process execution, or the like. A user device may provide login credentials to log in to one or more subsystems of the ECM system and may obtain an item (e.g., a document, a data file, an item of content, etc.) from a data structure of the ECM system. Similarly, the user device may provide an item for storage via the ECM system, may modify an item associated with the ECM system, or the like.

However, the ECM system may be unable to provide access to a particular subsystem, a particular stored item, or the like as a result of an issue with a portion of the ECM system. Implementations, described herein, may perform a comprehensive health check for an ECM system, thereby identifying issues for remediation and causing remediation actions to be implemented for the ECM system. In this way, a likelihood that a user device is incorrectly denied access to a portion of the ECM system is reduced relative to an ECM system for which a time-consuming, error-prone, manual health check is performed. Moreover, based on identifying an issue associated with the ECM system, the issue may be automatically corrected in a reduced period of time relative to a manual health check thereby improving performance of the ECM system.

Figure 1:
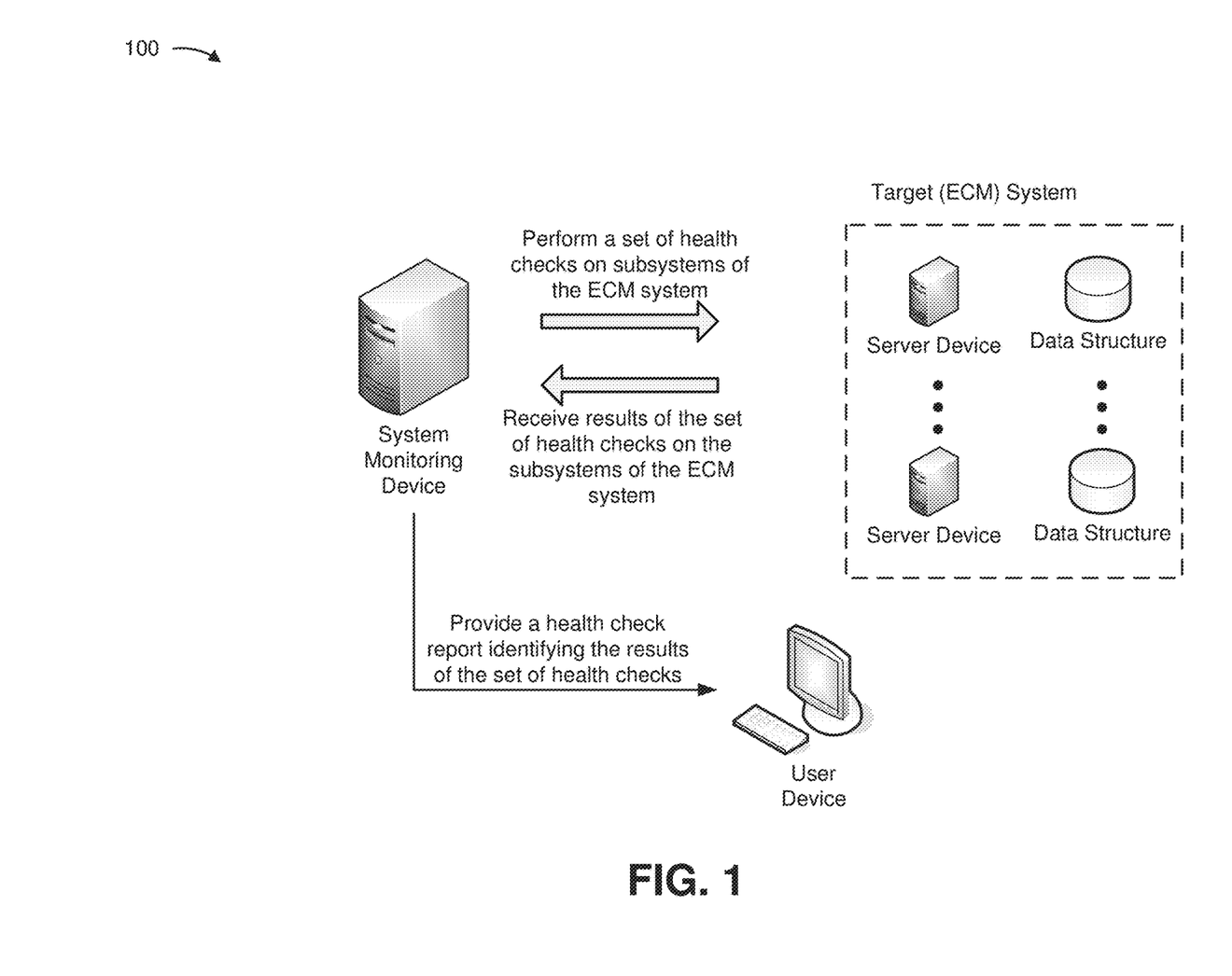
FIG. 1 is a diagram of an overview of an example implementation described herein.

FIG. 1 is a diagram of an overview of an example implementation 100 described herein. As shown in FIG. 1, example implementation 100 may include a system monitoring device, a target system (e.g., a particular ECM system, which includes a set of subsystems, upon which a health check is to be performed), and a user device. The target system may include a set of servers, a set of data structures, or the like.

As further shown in FIG. 1, the system monitoring device may perform a set of health checks on a set of portions of the target system. The system monitoring device may receive results of the set of health checks. For example, the system monitoring device may query a set of network addresses associated with the target system, and may obtain information regarding whether the set of network addresses direct the system monitoring device to an intended portion of the target system (e.g., an intended web site, an intended file, etc.). Additionally, or alternatively, the system monitoring device may access one or more resources of the target system via a set of credentials for the target system, and may obtain information regarding the one or more resources of the target system. For example, the system monitoring device may perform a set of test logins using a set of usernames and a set of passwords to determine whether the target system is properly granting access to files of the target system, services of the target system, applications of the target system, or the like.

Additionally, or alternatively, the system monitoring device may determine a set of metrics associated with the target system, such as an amount of time required to receive a response to a login attempt, an amount of available disk space associated with the set of data structures, or the like. For example, the system monitoring device may determine whether a threshold amount of disk space is available to the target system. In this case, the system monitoring device may analyze multiple data structures associated with the target system and determine whether the target system maintains a threshold amount of available disk space. As another example, the system monitoring device may connect to a database (e.g., an enterprise database, such as a structured query language (SQL) database, an Oracle database, or the like) of a particular data structure, and may obtain one or more metrics associated with the database, such as a query count, a latency associated with performing a query, or the like.

Additionally, or alternatively, the system monitoring device may parse stored information associated with the target system. For example, the system monitoring device may obtain a set of log files associated with the target system, and may parse the set of log files to determine information regarding a status of the target system. In this case, the system monitoring device may identify one or more issues associated with the target system based on parsing the set of log files. For example, the system monitoring device may parse the set of log files to identify a set of keywords included in the set of log files that correspond to an issue with the target system, such as identifying the word "error," "warning," or the like included in the set of log files. In this case, the system monitoring device may store information associated with identifying the set of keywords, such as a set of error identifiers included in the set of log files.

Additionally, or alternatively, the system monitoring device may identify a set of blocking queries directed to the target system based on information included in the set of log files. For example, the system monitoring device may utilize stored information to classify queries identified in the set of log files as blocking queries (e.g., a query that is active for a database and prevents other queries or modifications from being performed on the database). Additionally, or alternatively, the system monitoring device may parse the set of log files to determine if a background task is operating (e.g., a Java task, a .Net task, or the like). Similarly, the system monitoring device may determine whether one or more operating system specific services are operating on the target system, such as one or more Windows services or the like.

In some implementations, the system monitoring device may perform a set of response actions based on results of the set of health checks. For example, the system monitoring device may terminate a set of blocking queries based on identifying the set of blocking queries. As another example, the system monitoring device may identify a known error based on an error identifier included in a log file, may obtain instructions for correcting the known error, and may correct the known error based on the instructions. As another example, the system monitoring device may cause resources of the target system to be automatically reallocated based on metrics associated with the target system, such as reallocating a set of memory resources from a first server to a second server, reallocating a set of processing resources from a first subsystem to a second subsystem, or the like.

The system monitoring device may consolidate information obtained from the set of health checks into a health check report. For example, the system monitoring device may include, in the health check report, information identifying metrics associated with the target system, portions of the target system that are functioning as intended, portions of the target system that are not functioning as intended, response actions performed or caused to be performed on the target system, or the like. The system monitoring device may transmit the health check report to the user device for review by a user. For example, the system monitoring device may provide the health check report to a particular user device associated with a manager of the target system. As another example, the system monitoring device may provide the health check report to a user associated with managing a particular subsystem of the target system when the system monitoring device detects an issue associated with the particular subsystem.

In this way, the system monitoring device automatically determines a status of a target system and provides information to a user that the user may utilize in maintaining the target system. Moreover, based on automatically performing a response action based on the status of the target system, the system monitoring device improves performance of the target system. Moreover, the system monitoring device reduces a likelihood that a user device is unable to access resources of the target system based on automatically identifying an issue and causing the issue to be corrected, thereby reducing network traffic relative to user devices being repeatedly rejected from logging into the target system and transmitting retry requests to log into the target system.

Figure 2A:
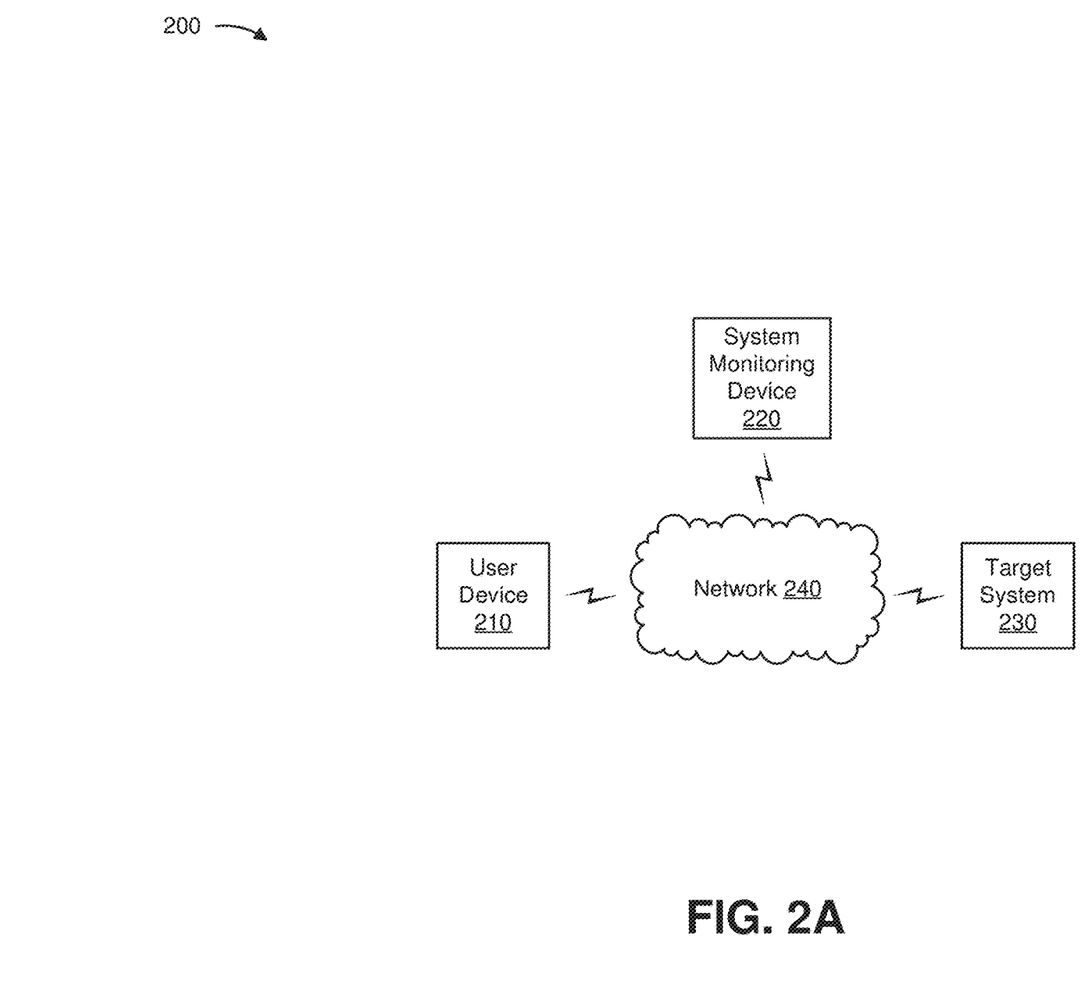
FIGS. 2A and 2B are diagrams of an example environment in which systems and/or methods, described herein, may be implemented.
Figure 2B:
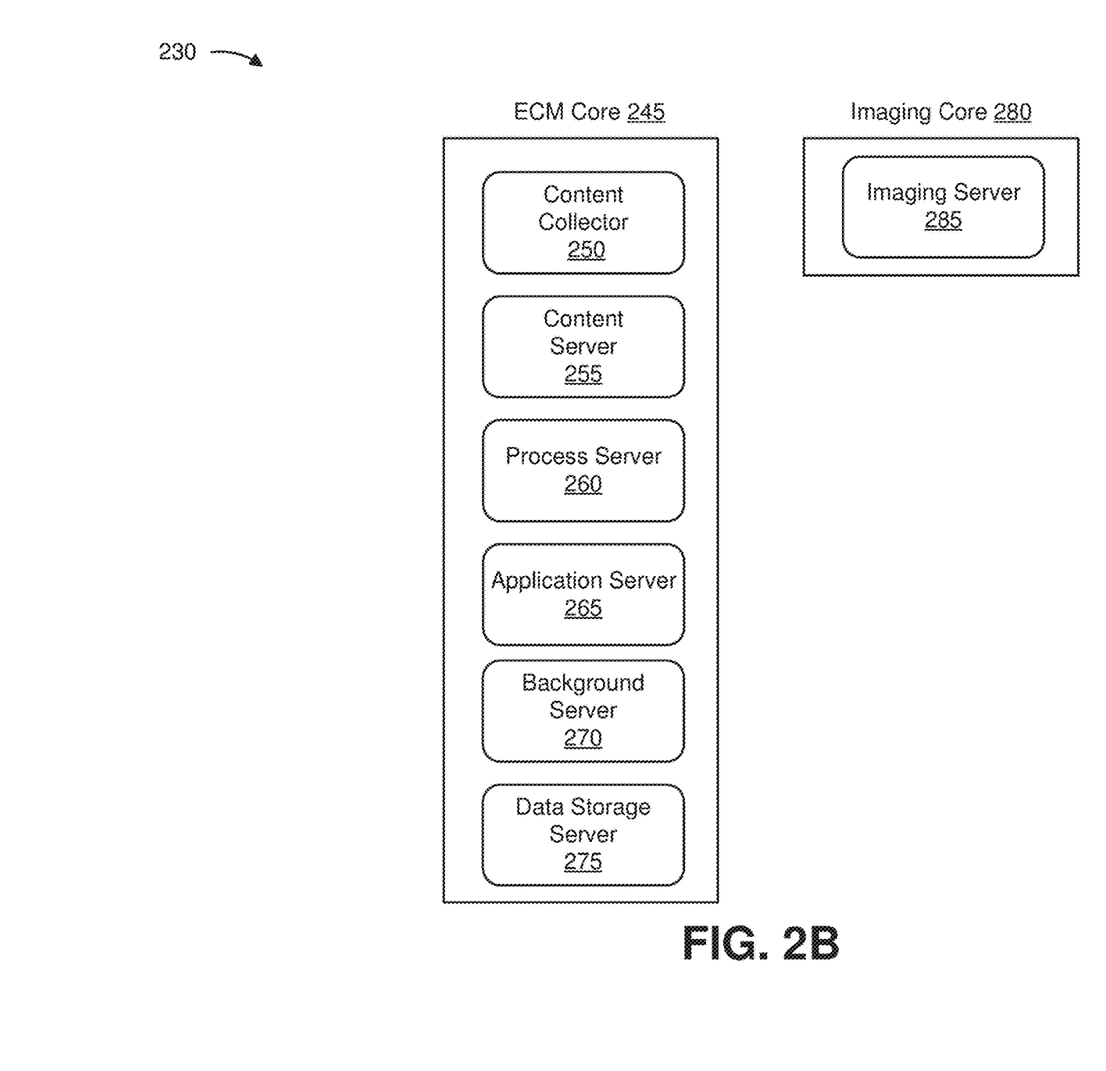

FIGS. 2A and 2B are a diagram of an example environment 200 in which systems and/or methods, described herein, may be implemented. As shown in FIG. 2A, environment 200 may include a user device 210, a system monitoring device 220, a target system 230, and a network 240. Devices of environment 200 may interconnect via wired connections, wireless connections, or a combination of wired and wireless connections.

User device 210 may include one or more devices capable of receiving, generating, storing, processing, and/or providing information associated with a health check. For example, user device 210 may include a computing device, such as a mobile phone (e.g., a smart phone, a radiotelephone, etc.), a computer (e.g., a desktop computer, a laptop computer, a tablet computer, a handheld computer, etc.), a wearable communication device (e.g., a smart wristwatch, a pair of smart eyeglasses, etc.), or a similar type of device. In some implementations, user device 210 may receive information from and/or transmit information to another device in environment 200.

System monitoring device 220 may include one or more devices capable of storing, processing, and/or routing information associated with a health check. For example, system monitoring device 220 may include a computer, a server, or a group of servers, such as a group of servers associated with a cloud computing environment, that obtain information regarding target system 230. In some implementations, system monitoring device 220 may include a communication interface that allows system monitoring device 220 to receive information from and/or transmit information to other devices in environment 200, such as user device 210, target system 230, or the like.

Target system 230 may include one or more devices capable of storing, processing, and/or routing information associated with an organization. For example, target system 230 may include a server or a group of servers that are a target of a set of health checks performed by system monitoring device 220. In some implementations, target system 230 may include an ECM system. In some implementations, target system 230 may include a set of subsystems or groups of subsystems of an ECM system, as described herein with regard to FIG. 2B. In some implementations, target system 230 may include a communication interface that allows target system 230 to receive information from and/or transmit information to other devices of environment 200, such as user device 210, system monitoring device 220, or the like.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

FIG. 2B is a diagram of example components of target system 230. As shown in FIG. 2B, target system 230 may include an ECM core 245, which includes a set of subsystems, such as a content collector 250, a content server 255, a process server 260, an application server 265, a background server 270, and a data storage server 275. Target system 230 may include an imaging core 280, which includes a set of subsystems, such as an imaging server 285.

Portions of target system 230 may interconnect via wired connections, wireless connections, or a combination of wired and wireless connections.

ECM core 245 may include one or more devices associated with storing, processing, and/or providing content. For example, ECM core 245 may include a group of servers, virtual networks, or the like, that may store, process, and/or provide content for target system 230. In some implementations, ECM core 245 may be associated with a set of functionalities, such as a document management functionality, a web content management functionality, a search functionality, a collaboration functionality, a records management functionality, a digital asset management functionality, a workflow management functionality, or the like. In some implementations, ECM core 245 may be associated with imaging core 280, which may provide an imaging functionality, such as an optical character recognition (OCR) functionality, a document processing functionality, or the like.

Content collector 250 may include one or more devices associated with storing, processing, and/or providing content. For example, content collector 250 may include a group of servers that is associated with managing information, such as a set of documents (e.g., emails, email attachments, messages, file system documents, etc.), digitized content, or the like. In some implementations, content collector 250 may receive, from an authenticated user device, a request for a stored document, and may provide the stored document as a response to the request. In some implementations, content collector 250 may provide one or more functionalities for target system 230 (e.g., an ECM system), such as a search functionality, an automated document retention and deletion functionality, or the like.

Content server 255 may include one or more devices associated with storing, processing, and/or providing content. For example, content server 255 may include a group of servers (e.g., an International Business Machines Corporation (IBM) FileNet content engine) that is associated with managing and providing information associated with one or more objects (e.g., workflow objects, custom objects, etc.), documents, or the like. In some implementations, content server 255 may perform one or more administrative functions for target system 230 (e.g., an ECM system). For example, content server 255 may receive a request to create, update, and/or retrieve information from a data structure (e.g., a database), and may perform an action as a response to the request.

Process server 260 may include one or more devices associated with storing, processing, and/or providing content. For example, process server 260 may include a group of servers (e.g., an IBM FileNet process engine) that is associated with providing one or more functionalities for managing a workflow, such as a process execution functionality, a process routing functionality, a rules management functionality, a process simulation and modeling functionality, a workflow analysis functionality, or the like. In some implementations, process server 260 may provide a directory functionality (e.g., via content server 255 as a centralized directory service) for target system 230 (e.g., an ECM system).

Application server 265 may include one or more devices associated with storing processing, and/or providing content. For example, application server 265 may include a group of servers (e.g., an IBM FileNet application engine) that provides one or more web applications, one or more web applets (e.g., a Java applet), one or more application development tools, or the like. In some implementations, application server 265 may provide a credentialing functionality for target system 230 (e.g., an ECM system), such as by providing information security for user credentials that are utilized to gain access to other portions of target system 230.

Background server 270 may include one or more devices associated with storing, processing, and/or providing content. For example, background server 270 may include a group of servers (e.g., a set of background job servers) that performs one or more functionalities associated with target system 230 (e.g., an ECM system) as one or more background processes. In some implementations, background server 270 may store information associated with the one or more background processes via a set of log files.

Data storage server 275 may include one or more devices associated with storing, processing, and/or providing content. For example, data storage server 275 may include a group of servers (e.g., database servers) that provides data storage for one or more portions of target system 230 (e.g., an ECM system, such as an IBM FileNet system). In some implementations, data storage server 275 may be partitioned into multiple portions, such as a portion allocated for content server 255, a portion allocated for process server 260, or the like. In some implementations, data storage server 275 may be dynamically reallocated, such as reallocating a quantity of memory resources to content server 255 based on determining that available memory resources allocated to content server 255 do not satisfy a threshold.

Imaging core 280 may include one or more devices associated with providing imaging functionalities associated with target system 230 (e.g., an ECM system). For example, imaging core 280 may include a group of servers, virtual networks, or the like that integrate with ECM core 245 to provide imaging functionalities (e.g., an OCR functionality, a digitization functionality, etc.) for subsystems of ECM core 245. In some implementations, imaging core 280 may include a particular type of imaging system, such as a Kofax server based imaging system. In some implementations, imaging core 280 may be associated with a set of documents that may be obtainable by portions of ECM core 245. For example, imaging core 280 may be associated with a data storage that may store information obtained based on performing an imaging functionality.

Imaging server 285 may include one or more devices associated with storing, processing, and/or providing content. For example, imaging server 285 may include a group of servers or other devices (e.g., an imaging server, an image capture device, or the like), that provides imaging functionalities for target system 230 (e.g., an ECM system), such as for digitization of documents, records, or the like. In some implementations, imaging server 285 may be utilized to digitize a document for storage via a subsystem of ECM core 245.

The number and arrangement of devices and networks shown in FIGS. 2A and 2B are provided as an example. In practice, there may be additional devices and/or networks, fewer devices and/or networks, different devices and/or networks, or differently arranged devices and/or networks than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices (e.g., one or more devices) of environment 200 may perform one or more functions described as being performed by another set of devices of environment 200.

Figure 3:
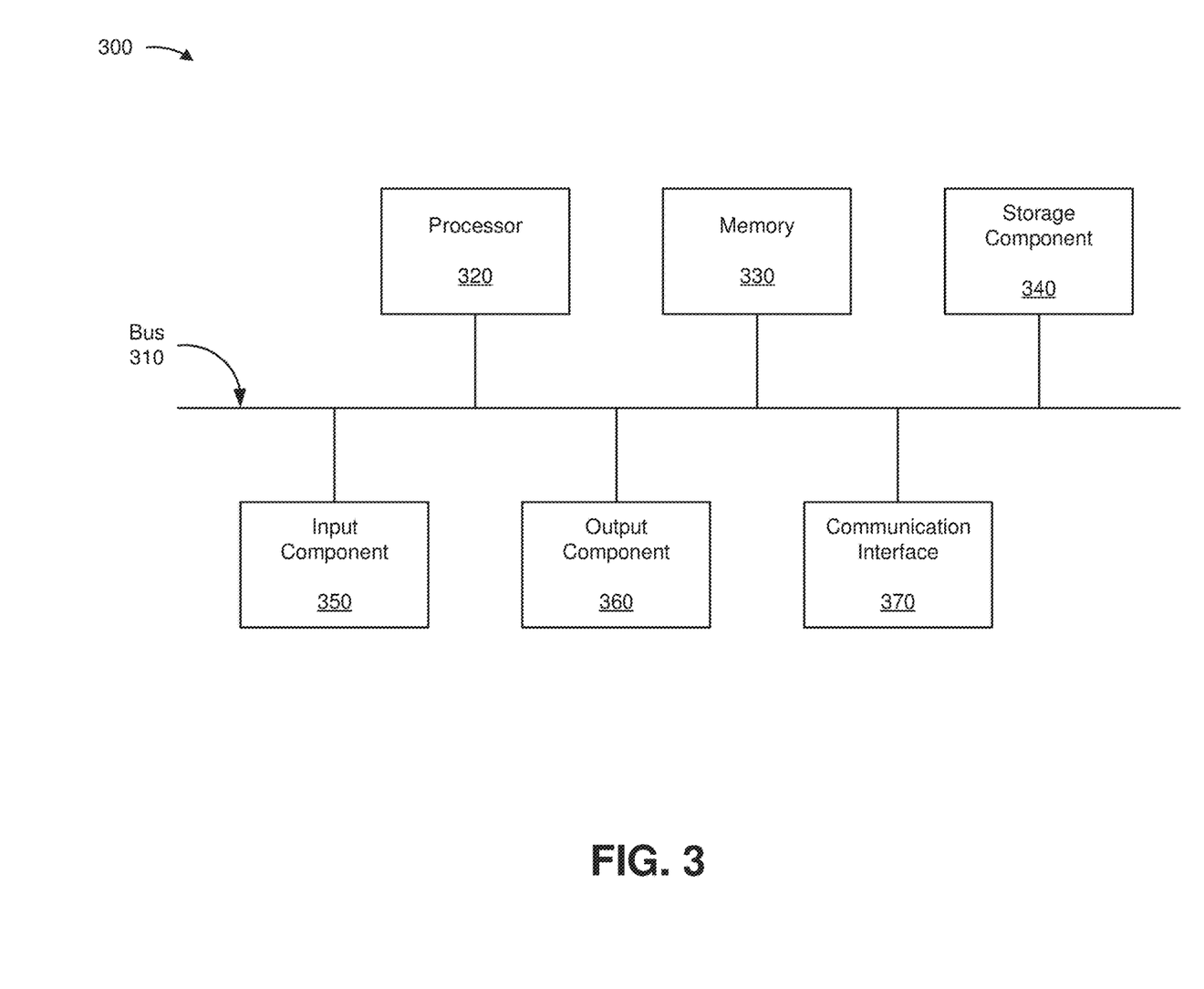
FIG. 3 is a diagram of example components of one or more devices of FIGS. 2A and 2B.

FIG. 3 is a diagram of example components of a device 300. Device 300 may correspond to user device 210, system monitoring device 220, and/or target system 230. In some implementations, user device 210, system monitoring device 220, and/or target system 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A non-transitory computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
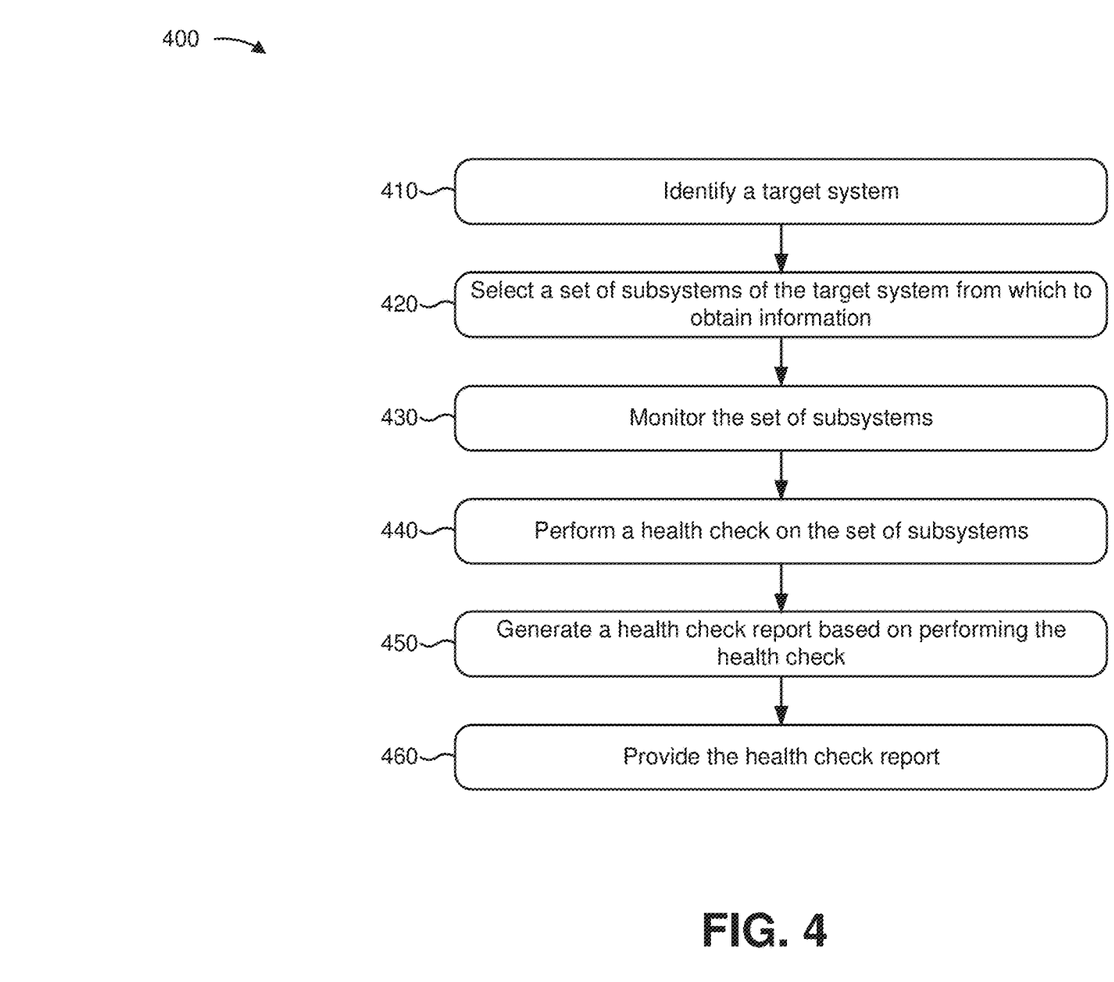

FIG. 4 is a flow chart of an example process 400 for performing a health check on a target system, such as an ECM system or the like. In some implementations, one or more process blocks of FIG. 4 may be performed by system monitoring device 220. In some implementations, one or more process blocks of FIG. 4 may be performed by another device or a group of devices separate from or including system monitoring device 220, such as user device 210 and target system 230.

As shown in FIG. 4, process 400 may include identifying a target system (block 410). For example, system monitoring device 220 may identify target system 230 as a target for a health check. In some implementations, system monitoring device 220 may select target system 230 from a set of target systems 230. For example, system monitoring device 220 may receive information identifying the set of target systems 230, and may select a particular target system 230 based on a set of decision criteria. In this case, the set of decision criteria may include an amount of time elapsed from a previous health check of target system 230, a type of target system 230 (e.g., a type of ECM system), or the like.

In some implementations, system monitoring device 220 may provide a user interface with which to receive input selecting target system 230. For example, system monitoring device 220 may cause a user interface to present information, and may receive a selection of a particular target system 230 based on providing the user interface. In some implementations, system monitoring device 220 may select multiple target systems 230. For example, system monitoring device 220 may obtain information identifying the multiple target systems 230, and may queue the multiple target systems 230 for performing respective health checks (e.g., consecutive health checks, concurrent health checks, or the like).

As further shown in FIG. 4, process 400 may include selecting a set of subsystems of the target system from which to obtain information (block 420). For example, system monitoring device 220 may select the set of subsystems of target system 230 from which to obtain information. In some implementations, system monitoring device 220 may select the set of subsystems (e.g., a portion of ECM core 245, a portion of imaging core 280, or the like) based on a set of decision criteria. For example, system monitoring device 220 may select one or more subsystems associated with target system 230 based on a criticality determination, a threshold period of time elapsing from a previous health check, or the like. In some implementations, system monitoring device 220 may select all subsystems of target system 230. For example, system monitoring device 220 may identify a set of subsystems of target system 230, and may determine to perform health checks on each subsystem of the set of subsystems.

In some implementations, system monitoring device 220 may receive information associated with selecting the set of subsystems of target system 230. For example, system monitoring device 220 may provide a user interface with which to receive a selection of one or more subsystems of target system 230, and may receive information identifying the selection based on providing the user interface. Additionally, or alternatively, system monitoring device 220 may receive a trigger causing system monitoring device 220 to perform a health check on a particular set of subsystems. For example, user device 210 may transmit a message to system monitoring device 220 identifying the particular set of subsystems of target system 230, and may cause system monitoring device 220 to perform a set of health checks on the particular set of subsystems.

In some implementations, system monitoring device 220 may omit selecting the set of subsystems. For example, system monitoring device 220 may be triggered to perform a health check on target system 230 and may perform the health check on target system 230 without selecting the set of subsystems of target system 230. In this case, system monitoring device 220 may perform the health check on all subsystems of target system 230 or the like.

As further shown in FIG. 4, process 400 may include monitoring the set of subsystems (block 430). For example, system monitoring device 220 may monitor the set of subsystems of target system 230. In some implementations, system monitoring device 220 may establish a connection to the set of subsystems of target system 230. For example, system monitoring device 220 may utilize a set of login credentials to access a particular subsystem, and may monitor the particular subsystem based on utilizing the set of login credentials. In this case, system monitoring device 220 may monitor alterations to a log file associated with the particular subsystem, alterations to a data structure associated with the particular subsystem, an availability of the particular subsystem, or the like. Additionally, or alternatively, system monitoring device 220 may monitor network traffic associated with the set of subsystems of target system 230. For example, system monitoring device 220 may connect to target system 230, a network routing device associated with target system 230 (e.g., a firewall, a proxy server, a gateway, etc.), or the like, and may monitor network traffic associated with target system 230.

As further shown in FIG. 4, process 400 may include performing a health check on the set of subsystems (block 440). For example, system monitoring device 220 may perform the health check on the set of subsystems of target system 230. In some implementations, system monitoring device 220 may perform a set of health checks on target system 230. For example, system monitoring device 220 may perform a first health check on a first portion of target system 230 (e.g., a first subsystem of the set of subsystems) and a second health check on a second portion of target system 230 (e.g., a second subsystem of the set of subsystems).

In some implementations, system monitoring device 220 may perform multiple types of health checks. For example, system monitoring device 220 may perform a first type of health check on a first subsystem that includes validating a set of network addresses of the first subsystem and may perform a second type of health check on a second subsystem that includes parsing a log file of the second subsystem to identify an issue. In some implementations, system monitoring device 220 may perform the health check on the set of subsystems based on monitoring the set of subsystems. For example, system monitoring device 220 may store information regarding the set of subsystems for inclusion in a health check report based on monitoring the set of subsystems.

In some implementations, system monitoring device 220 may determine whether a set of network addresses associated a particular subsystem of target system 230 is valid. For example, system monitoring device 220 may determine a status of a set of web addresses (e.g., whether accessing a set of uniform resource locators (URLs) causes a portion of target system 230 to provide expected information, such as expected presentation of a website associated with the particular subsystem of target system 230 or the like). Additionally, or alternatively, system monitoring device 220 may determine whether a set of web services are operating as expected (e.g., whether accessing a particular web services URL associated with a particular subsystem of target system 230 returns expected information, such as access to an expected web service or the like).

In some implementations, system monitoring device 220 may utilize a set of credentials to perform the health check on the set of network addresses. For example, system monitoring device 220 may select a set of user names and corresponding passwords intended to grant access to target system 230, and may determine whether access is correctly granted to target system 230 based on utilizing the set of user names and corresponding passwords. In some implementations, system monitoring device 220 may verify that a particular user name and password, which is associated with access to a particular subsystem of target system 230, is correctly associated with being granted access to the particular subsystem of target system 230 (rather than one or more other subsystems of target system 230).

In some implementations, system monitoring device 220 may perform a health check to determine whether a file transfer protocol (FTP) address associated with a particular subsystem of target system 230 is operating correctly. For example, system monitoring device 220 may access the FTP address and attempt to request and receive data from a particular subsystem of target system 230 associated with providing information via the FTP address. Additionally, or alternatively, system monitoring device 220 may determine a quantity of available disk space associated with the particular subsystem accessed via the FTP address, a quantity of files available via the FTP address, or the like. Additionally, or alternatively, system monitoring device 220 may obtain a log file associated with the FTP address. For example, system monitoring device 220 may obtain a log file, and may parse the log file to identify one or more issues identified by the log file.

In some implementations, system monitoring device 220 may obtain information regarding one or more data structures associated with a particular subsystem of target system 230. For example, system monitoring device 220 may perform a health check on a particular database, and may identify one or more blocking queries associated with the particular database. Additionally, or alternatively, system monitoring device 220 may determine a size of the particular database. For example, system monitoring device 220 may determine whether a capacity issue is likely based on the size of the particular database not exceeding a threshold size. In some implementations, system monitoring device 220 may automatically identify a performance issue when performing the health check. For example, when system monitoring device 220 obtains information regarding a database, system monitoring device 220 may determine that a queue associated with the database exceeds a threshold quantity of items (e.g., queries, responses, etc.), and may store information indicating that a performance issue may be resulting from the queue exceeding the threshold quantity of items.

In some implementations, system monitoring device 220 may identify one or more background procedures when performing the health check. For example, system monitoring device 220 may obtain a log file, and may determine that a particular set of background procedures are operating on a particular subsystem of target system 230 based on parsing the log file. Additionally, or alternatively, system monitoring device 220 may determine whether one or more services are operating on the particular subsystem. For example, system monitoring device 220 may determine that a particular set of operating system-specific services (e.g., Windows services) are executing on target system 230.

In some implementations, system monitoring device 220 may obtain one or more application log files associated with one or more applications operating on target system 230. For example, system monitoring device 220 may obtain an application log file and may parse the application log file to identify an error. In some implementations, system monitoring device 220 may utilize a set of identifiers to parse a log file. For example, system monitoring device 220 may determine that a particular keyword (e.g., "error," "failure," "terminate," etc.), included in the set of identifiers, is included in the application log file. In this case, system monitoring device 220 may determine that an error has occurred with the application based on the particular keyword being included in the application log file.

In some implementations, system monitoring device 220 may determine one or more metrics associated with one or more servers of a particular subsystem of target system 230. For example, system monitoring device 220 may determine whether an amount of disk space available for a particular server fails to satisfy a threshold amount. Additionally, or alternatively, system monitoring device 220 may determine a latency associated with requesting information from the particular server. Additionally, or alternatively, system monitoring device 220 may determine an amount of users that are utilizing the particular server via respective devices.

In some implementations, system monitoring device 220 may automatically perform a remedial action associated with a result of a portion of the health check. For example, when system monitoring device 220 detects a blocking query associated with a particular database, system monitoring device 220 may automatically terminate the blocking query, thereby improving system stability of the database. As another example, when system monitoring device 220 identifies an insufficient amount of computing resources allocated to a particular subsystem of target system 230, system monitoring device 220 may cause additional computing resources to be automatically reallocated to the particular subsystem. As another example, when system monitoring device 220 identifies an error (e.g., based on parsing a log file), system monitoring device 220 may obtain information regarding correcting the error (e.g., from a data structure storing information regarding fixing issues with target system 230), and may correct the error based on the information.

In some implementations, system monitoring device 220 may perform the health check when target system 230 is operating. For example, system monitoring device 220 may obtain information regarding target system 230 without causing a service outage for target system 230. Additionally, or alternatively, system monitoring device 220 may perform the health check when target system 230 is not operating.

As further shown in FIG. 4, process 400 may include generating a health check report based on performing the health check (block 450). For example, system monitoring device 220 may generate the health check report based on performing the health check of target system 230. In some implementations, system monitoring device 220 may include information regarding network addresses associated with the set of subsystems of target system 230 in the health check report. For example, system monitoring device 220 may include information identifying results of accessing a particular set of network addresses (e.g., web addresses, web services addresses, FTP addresses, etc.). In this case, system monitoring device 220 may identify one or more network addresses that did or did not correctly resolve to an expected portion of target system 230, a set of login credentials that were or were not correctly processed when provided via a particular network address, or the like.

Additionally, or alternatively, system monitoring device 220 may include information regarding a set of log files associated with the set of subsystems of target system 230 based on performing the health check. For example, system monitoring device 220 may include, in the health check report, information identifying contents of a particular log file, a set of issues detected based on parsing the particular log file, a set of blocking queries identified based on parsing the particular log file, or the like. Additionally, or alternatively, system monitoring device 220 may include information identifying a set of metrics associated with target system 230 based on performing the health check. For example, system monitoring device 220 may provide information identifying one or more subsystems of target system 230 associated with computing resources that fail to satisfy a threshold (e.g., one or more subsystems associated with insufficient memory resources, insufficient processing resources, etc.). As another example, system monitoring device 220 may identify a subsystem associated with a performance metric that fails to satisfy a performance metric threshold, such as a server that is associated with responding to a query in an amount of time that exceeds a time threshold.

Additionally, or alternatively, system monitoring device 220 may include information regarding operation of one or more subsystems of target system 230 based on performing the health check. For example, system monitoring device 220 may include, in the health check report, information identifying a set of background tasks or jobs, a set of applications, a set of applets, a set of operating system-specific services, or the like that are operating via target system 230. In some implementations, system monitoring device 220 may include information identifying one or more response actions performed by system monitoring device 220. For example, when system monitoring device 220 identifies a known error and automatically corrects the known error, system monitoring device 220 may include, in the health check report, information identifying the known error and one or more corrective steps performed.

In some implementations, system monitoring device 220 may generate a health score for target system 230. For example, based on results of performing the set of health checks, system monitoring device 220 may determine a health score for the target system 230, and may include the health score in the health check report. In some implementations, system monitoring device 220 may score multiple different health checks performed on target system 230. For example, system monitoring device 220 may determine a first health score for a first subsystem of target system 230 and a second health score for a second subsystem of target system 230. In this case, system monitoring device 220 may combine the first health score and the second health score to generate a combined health score for target system 230. In some implementations, system monitoring device 220 may automatically perform one or more response actions based on the health score, such as based on the health score failing to exceed a threshold. For example, system monitoring device 220 may automatically notify a set of administrators, automatically transmit a set of alerts, or the like based on the health score.

In some implementations, system monitoring device 220 may classify a set of issues associated with target system 230 when generating the health check report. For example, system monitoring device 220 may identify a set of classification criteria, such as an issue criticality, an issue type, or the like, and may classify a set of issues detected when performing the health check (e.g., by categorizing the set of issues, highlighting one or more issues of the set of issues, etc.). Additionally, or alternatively, system monitoring device 220 may classify a set of issues associated with target system 230 based on whether a particular issue can be automatically corrected, whether the issue is being automatically corrected, whether the particular issue has been automatically corrected, or the like. In this case, system monitoring device 220 may provide information identifying a classification of each issue, thereby permitting a user to prioritize issues for correction. Additionally, or alternatively, system monitoring device 220 may automatically prioritize issues for correction based on classifying the set of issues.

As further shown in FIG. 4, process 400 may include providing the health check report (block 460). For example, system monitoring device 220 may provide the health check report associated with target system 230. In some implementations, system monitoring device 220 may provide the health check report to user device 210. For example, system monitoring device 220 may provide the health check report for presentation to a user via a user interface of user device 210. In some implementations, system monitoring device 220 may identify one or more relevant stakeholders based on the health check report, and may provide the health check report to the one or more relevant stakeholders. For example, when system monitoring device 220 identifies a particular error associated with a particular subsystem of target system 230, system monitoring device 220 may identify a particular administrator assigned to manage issues associated with the particular subsystem (e.g., based on a data structure storing information identifying administrators for subsystems of target system 230), and may provide a portion of the health check report identifying the particular error.

In some implementations, system monitoring device 220 may provide the health check report to cause one or more issues associated with target system 230 to be resolved. For example, system monitoring device 220 may provide information identifying an issue to another device associated with resolving the issue (e.g., system monitoring device 220 may provide, to a control device, information indicating a failure to allocate a threshold quantity of memory resources to a particular subsystem, and may cause the control device to reallocate memory resources to the particular subsystem, such that allocated memory resources exceed the threshold quantity).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, system monitoring device 220 performs a comprehensive health check on target system 230 (e.g., an ECM system), and provides a report regarding target system 230. Moreover, system monitoring device 220 automatically corrects one or more issues associated with target system 230 based on detecting the one or more issues when performing the health check.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
perform a set of health checks on a set of subsystems within an enterprise content management (ECM) system,
the set of health checks including at least one of:
a validation of a set of network addresses associated with the set of sub systems,
an analysis of a set of log files associated with the set of subsystems, or
a determination of a set of metrics associated with the set of subsystems,
the set of health checks relating to a status of the ECM system; and
perform a response action based upon the status of the ECM system,
the response action automatically causing one or more issues identified in the set of health checks to be corrected,
the response action reducing network traffic relative to user devices being unable to access the ECM system, and
the response action including at least one of:
terminating a set of blocking queries associated with a database of the ECM system,
causing a set of resources to be reallocated from a first subsystem of the ECM system to a second subsystem of the ECM system, or
correcting an error, of a set of known errors, associated with the ECM system.

2. The device of claim 1, where the one or more processors are further to:
identify a criticality of the one or more issues identified in the set of health checks to be corrected.

3. The device of claim 1, where the one or more processors are further to:
generate a health score for each subsystem;
where the one or more processors, when performing the response action, are further to:
perform the response action automatically based on the health score failing to exceed a threshold.

4. The device of claim 1, where the one or more processors are further to:
provide a user interface,
the user interface for selecting the first subsystem in which to reallocate the set of resources.

5. The device of claim 1, where the one or more processors are further to:
receive a trigger causing the device to perform the set of health checks on the set of subsystems.

6. The device of claim 1, where the one or more processors, when automatically causing the one or more issues identified in the set of health checks to be corrected, are to:

obtain information regarding correcting the one or more issues identified in the set of health checks, and correct the one or more issues identified in the set of health checks based on the information.

7. The device of claim 1, where the first subsystem and the second subsystem include at least one of:
a content collector,
a content server,
a process server,
an application server,
a background server,
a data storage server, or
an imaging server.

8. A non-transitory computer-readable medium storing instructions, the instructions comprising:
one or more instructions that, when executed by one or more processors, cause the one or more processors to:
identify a target system on which to perform a health check;
perform the health check on the target system,
the health check including a determination of a status of a plurality of subsystems of the target system; and
perform a response action based upon the status of the target system,
the response action automatically causing one or more issues identified in the health check to be corrected,
the response action reducing network traffic relative to user devices being unable to access the target system, and
the response action including at least one of:
terminating a set of blocking queries associated with a database of the target system,
causing a set of resources to be reallocated from a first subsystem of the target system to a second subsystem of the target system, or
correcting an error, of a set of known errors, associated with the target system.

9. The non-transitory computer-readable medium of claim 8, where the target system is an enterprise content management system; and
where the plurality of subsystems include at least one of:
a content collector,
a content server,
a process server,
an application server,
a background server,
a data storage server, or
an imaging server.

10. The non-transitory computer-readable medium of claim 8, where the one or more instructions, that cause the one or more processors to perform the health check, cause the one or more processors to:
identify a log file associated with a particular subsystem of the plurality of subsystems, and
parse the log file to identify an issue with the particular subsystem.

11. The non-transitory computer-readable medium of claim 10, where the one or more instructions, that cause the one or more processors to parse the log file, cause the one or more processors to:
determine whether a keyword, of a set of keywords, is included in the log file,
each keyword, of the set of keywords, being associated with identifying a particular issue; and
identify the issue with the particular subsystem based on determining that the keyword is included in the log file.

12. The non-transitory computer-readable medium of claim 8, where the one or more instructions, that automatically cause the one or more issues identified in the health check to be corrected, cause the one or more processors to:
obtain information regarding correcting the one or more issues identified in the health check, and
correct the one or more issues identified in the health check based on the information.

13. The non-transitory computer-readable medium of claim 8, where the one or more instructions, when executed by the one or more processors, further cause the one or more processors to:
generate a health score for each subsystem;
where the one or more instructions, that cause the one or more processors to perform the response action, cause the one or more processors to:
perform the response action automatically based on the health score failing to exceed a threshold.

14. The non-transitory computer-readable medium of claim 8, where the one or more instructions, when executed by the one or more processors, further cause the one or more processors to:
generate a health check report based on the health check, the health check report including information associated with:
validation of a set of network addresses,
analysis of a set of log files, and
determination of a set of metrics associated with the first subsystem and the second subsystem; and
provide the health check report.

15. The non-transitory computer-readable medium of claim 14, where the one or more instructions, that cause the one or more processors to perform the health check, cause the one or more processors to:
determine one or more metrics regarding the database of the target system; and
where the one or more instructions, that cause the one or more processors to generate the health check report, cause the one or more processors to:
include, in the health check report, information identifying the one or more metrics regarding the database of the target system.

16. A method, comprising:
providing, by a device, information identifying a status of an enterprise content management system,
the status being related to:
an application associated with the enterprise content management system,
an availability of the enterprise content management system, or
a stability of the enterprise content management system;
identifying, by the device, a remedial action based on the status of the enterprise content management system; and
automatically performing, by the device, the remedial action to correct an issue associated with the enterprise content management system,
the remedial action reducing network traffic relative to user devices being unable to access the enterprise content management system, and
the remedial action including at least one of:
terminating a set of blocking queries associated with a database of the enterprise content management system, causing a set of resources to be reallocated from a first subsystem of the enterprise content management system to a second subsystem of the enterprise content management system, or correcting an error, of a set of known errors, associated with the enterprise content management system.

17. The method of claim 16, further comprising:

identifying a plurality of issues associated with the enterprise content management system;

classifying the plurality of issues based on a set of classification criteria; and where providing the information identifying the status of the enterprise content management system comprises:

providing information identifying classifications of the plurality of issues.

18. The method of claim 16, further comprising:
generating a health score for the first subsystem and the second subsystem, and where automatically performing the remedial action is based upon the health score of the first subsystem or the second subsystem failing to exceed a threshold.

19. The method of claim 16, further comprising:
providing a user interface to receive input for selecting the enterprise content management system.

20. The method of claim 16, where the first subsystem and the second subsystem include at least one of:
a content collector,
a content server,
a process server,
an application server,
a background server,
a data storage server, or
an imaging server.

* * * * *